United States Patent [19]

Kontz

[11] Patent Number: 4,629,389
[45] Date of Patent: * Dec. 16, 1986

[54] MEANS FOR HOLDING AND ROTATING CONTAINERS TRAVELING AROUND A TURRET PERIPHERY

[75] Inventor: Robert F. Kontz, Toledo, Ohio

[73] Assignee: Owens-Illinois, Inc., Toledo, Ohio

[*] Notice: The portion of the term of this patent subsequent to Feb. 28, 2001 has been disclaimed.

[21] Appl. No.: 774,371

[22] Filed: Sep. 6, 1985

Related U.S. Application Data

[63] Continuation of Ser. No. 511,124, Jul. 6, 1983, abandoned.

[51] Int. Cl.$^4$ .............................................. B65C 9/04
[52] U.S. Cl. ..................................... 414/433; 82/101; 156/567; 198/377; 198/803.11; 414/786
[58] Field of Search ................ 414/433, 786; 198/377, 198/379, 394, 470.1, 474.1, 803.9, 473.1, 803.11; 294/106, 902; 156/86, 567, DIG. 26; 269/203, 289 MR; 82/97, 101, 38 R, 45, 2.5, 2.7; 141/165, 168, 312

[56] References Cited

U.S. PATENT DOCUMENTS

| | | | |
|---|---|---|---|
| 2,528,860 | 11/1950 | Clark | 198/377 |
| 2,843,252 | 7/1958 | Eddison et al. | 198/394 |
| 2,888,127 | 5/1959 | Uhlig | 198/653 X |
| 3,460,669 | 8/1969 | Johnson | 198/803 X |
| 3,783,992 | 1/1974 | Cook | 198/377 |
| 4,384,907 | 5/1983 | Aidlin et al. | 156/86 |
| 4,465,422 | 8/1984 | Blust, Sr. et al. | 414/433 |
| 4,468,277 | 8/1984 | Kontz | 198/803 X |

Primary Examiner—Joseph E. Valenza
Assistant Examiner—David A. Bucci
Attorney, Agent, or Firm—John R. Nelson

[57] ABSTRACT

Jaws for receiving, holding, and rotating containers around a turret periphery are provided, the jaws being easily and efficiently adjusted to accommodate various sizes of containers, such as, for instance, oriented plastic carbonated beverage bottles in sizes ranging from about ½ liter to about 2 liters. The same original center line for the container is maintained.

3 Claims, 3 Drawing Figures

MEANS FOR HOLDING AND ROTATING CONTAINERS TRAVELING AROUND A TURRET PERIPHERY

This application is a continuation of application Ser. No. 511,124, filed July 6, 1983, now abandoned.

The present invention relates to means for holding in alignment and rotating containers as the containers travel around the periphery of a turret. The present invention more particularly relates to jaw means for holding and rotating containers around a turret periphery where oriented plastic tubular sleeves are telescopically assembled onto the container and heat-shrunk thereon during the travel around the periphery.

It is desirable to have means for holding containers as they travel around a turret periphery, the means holding the container in alignment while rotating and transporting the containers around the periphery for an operation such as telescopically assembling oriented plastic tubular sleeves on the containers and heat-shrinking the sleeves thereon. It is particularly desirable to have adjustable jaw means to hold the containers in order to easily and efficiently accommodate various sizes of containers and still maintain the center location of each size of container.

It is an object of the present invention to provide an adjustable jaw means for holding various sizes of containers and still maintain the same center for the container, the adjustable jaw means holding the container in alignment while transporting and rotating the container around a turret periphery.

It is an object to provide an adjustable jaw means that maintains the original center line for various sizes of containers, the jaw means holding the containers in vertical alignment while transporting and rotating the containers around the periphery of a turret.

These and other objects will become apparent from the specification that follows, the appended claims, and the drawings, in which:

Figure 1:
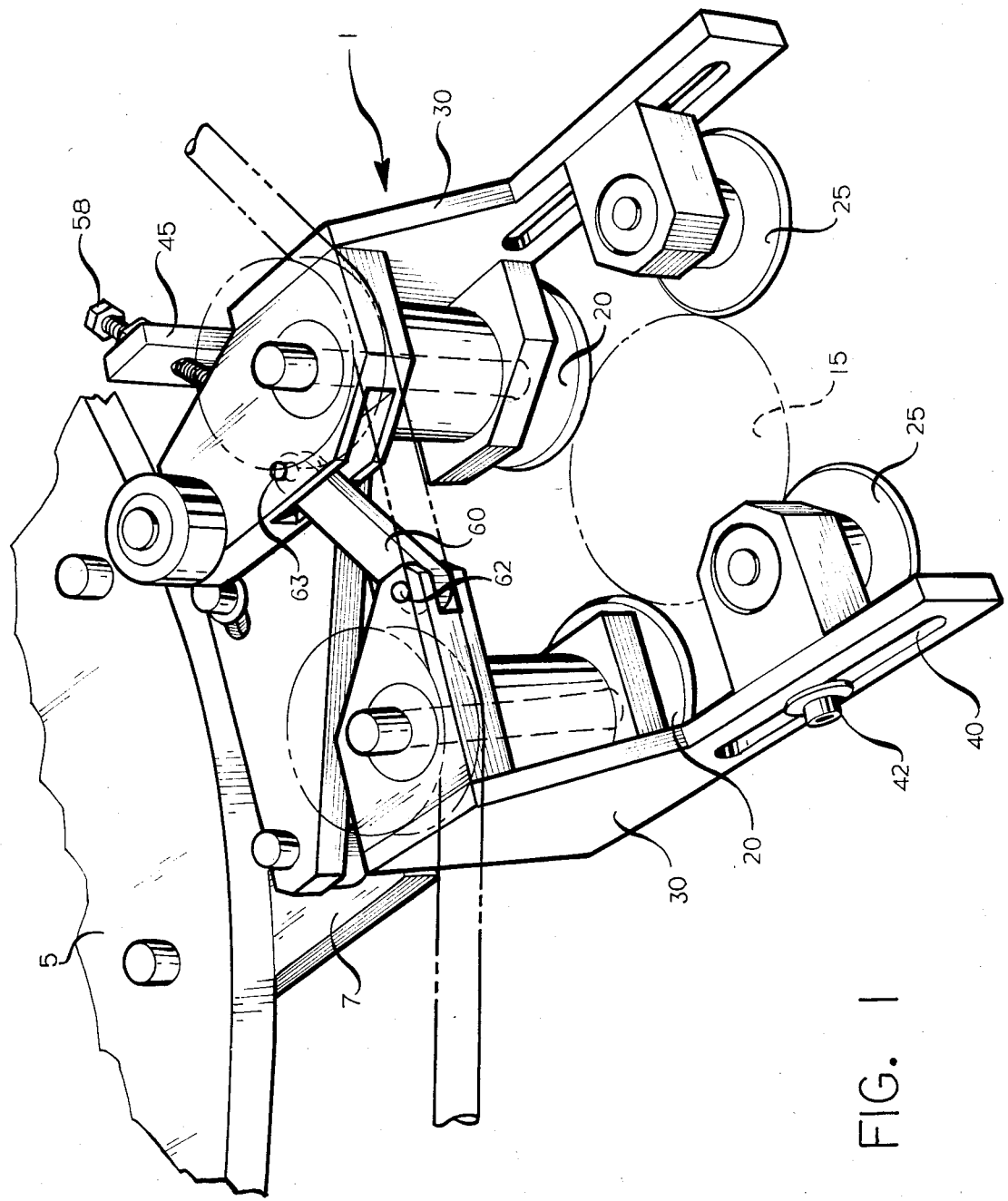
FIG. 1 is a fragmentary perspective view showing the adjustable jaw means of the present invention mounted on the peripheral edge of a rotatable turret.

The present invention provides adjustable jaw means for holding containers especially adapted for use in machine comprising a rotatable turret in which containers travel around the turret periphery and are provided with oriented plastic tubular sleeves that are heat-shrunk thereon, the machine being described in a United States patent application for Robert F. Kontz, entitled "Methods and Machines for Placing and Heating Oriented Plastic Heat-Shrinkable Sleeves on Containers", assigned to the same assignee as the present application, and being filed concurrently herewith. This application is incorporated by reference, it being Ser. No. 510,482 now U.S. Pat. No. 4,496,409.

The present invention provides adjustable jaw means and methods for holding and rotating containers around a turret periphery, the adjustable jaw means being so constructed and arranged that the upper portion of the container is held and rotated between a pair of driven periphery rollers and a pair of outer idler rollers, a periphery member connecting the periphery rollers and there being an arm between each idler roller and each periphery roller, each idler roller being adjustably connected to each arm, the distance between the arms being easily adjusted to accommodate different bottle sizes and the distance between the periphery rollers being easily adjusted to accommodate different bottle sizes.

The present invention also provides an outstanding method for holding and rotating containers around a turret periphery, the method comprising the steps of: (a) feeding containers to the turret periphery, (b) grasping and holding each container with adjustable jaw means so constructed and arranged that the container is held in an aligned position while being transported and rotated around the periphery, (c) adjusting the adjustable jaw means to easily accommodate and hold a different diameter size of the containers, and (d) maintaining the same center line for the container with the different size container.

As seen in the drawings, there is provided adjustable jaw means 1 for use in a machine having a rotating turret and a driven disc 5 that revolves around the center of the turret. A plate 7 is provided, rigidly connected to the disc 5 and carrying the adjustable jaw means 1. The jaw means 1 is so constructed and arranged that a container 15 is held and rotated between a pair of driven peripheral rollers 20 and a pair of idler rollers 25. There is shown in the drawings an arm 30 between each roller 20 and the idler roller 25 on the same side of the container 15.

Each idler roller 25 is adjustably connected to its corresponding arm 30 by means of an elongated slot 40 and fastening means such as a bolt 42.

Figure 2:
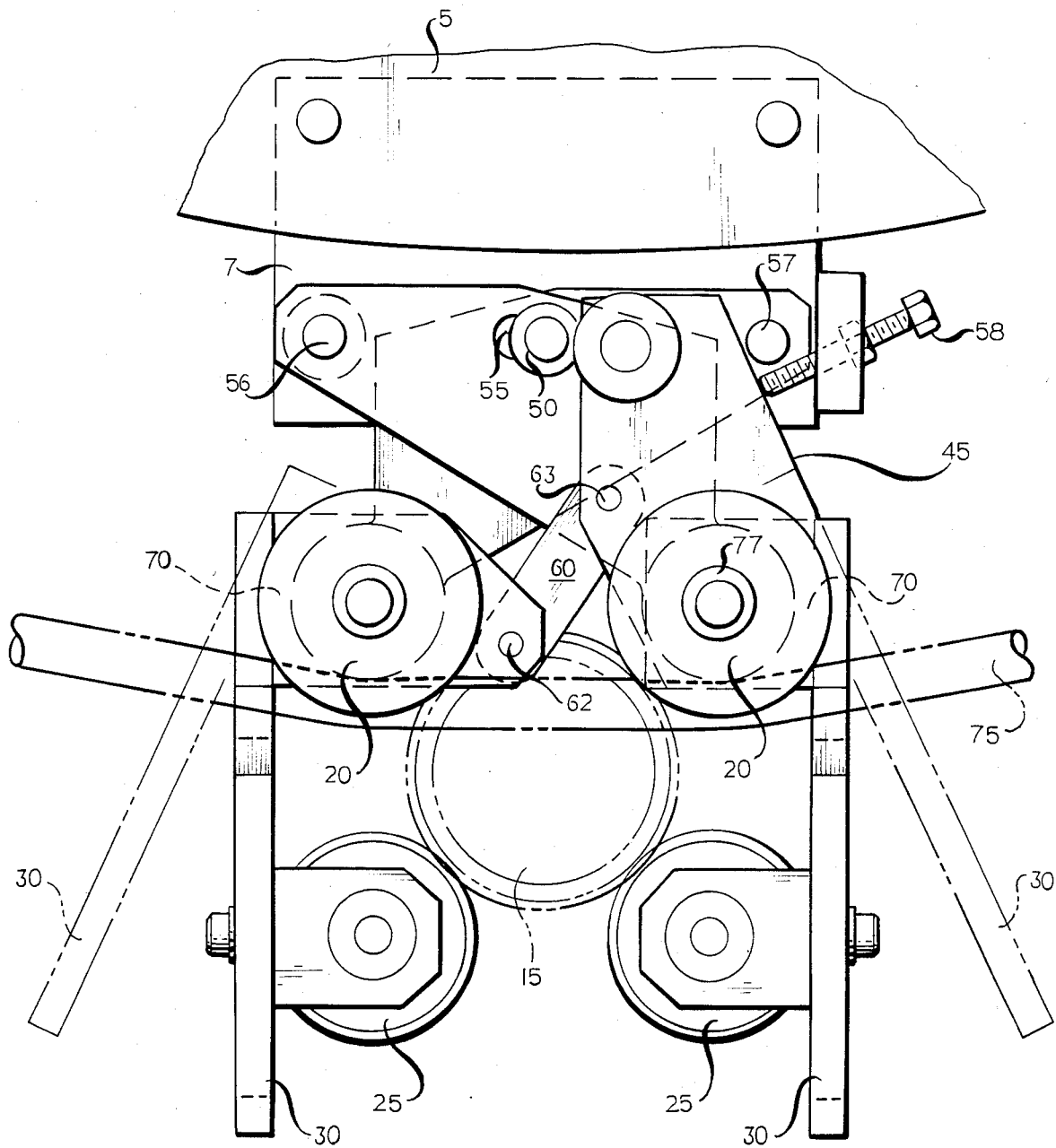
FIG. 2 is a fragmentary top plan view of the adjustable jaw means and a container held in alignment therein.
Figure 3:
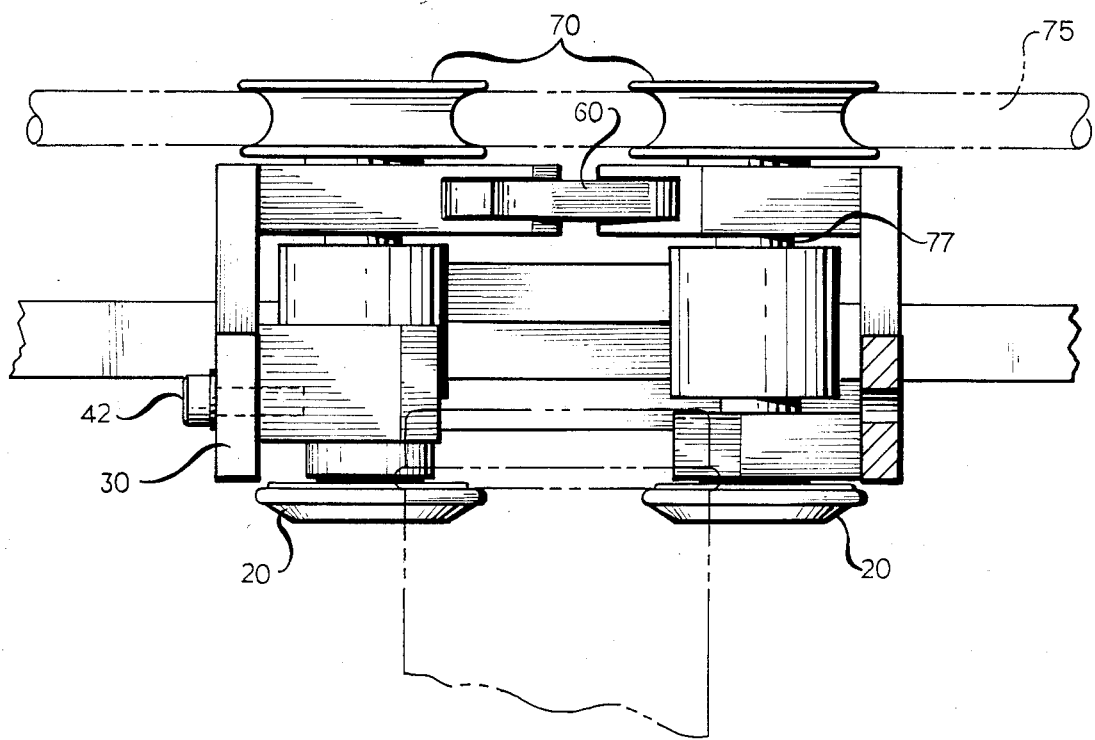
FIG. 3 is a fragmentary elevational view of the adjustable jaw means of the present invention.

An adjustable periphery member 45 connects the peripheral rollers 20. As, for instance, seen in FIG. 2, the distance between the rollers 20 can easily be changed by changing the position of bolt 50 in slot 55. Stop bolt 58 is also adjustable. The adjustable jaw parts pivot with the adjustments as best seen in dot-dash lines in FIG. 2. The parts generally pivot about the bolts 56 and 57.

The link 60 with pivot points 62 and 63 can also be changed to a different size although this is not generally necessary for small changes to accommodate slightly different container sizes.

In the embodiment shown, the rotation of the rollers 20 is accomplished by the driving of pulley wheels 70 by a rope 75, the pulley wheels 70 and rollers 20 being connected to the same shaft 77.

What is claimed is:

1. A machine for rotating containers around a turret periphery, there being adjustable jaw means for holding and rotating the containers on a line of travel around the turret periphery, the jaw means being so constructed and arranged that the upper portion of the container is held and rotated between a pair of periphery rollers and a pair of outer idler rollers, a periphery member connecting the periphery rollers and there being an arm between each periphery roller and each idler roller, each idler roller being adjustably connected to each arm, means for adjustably connecting each idler roller to each arm, means for permitting the distance between the arms to be adjusted to accommodate different container sizes and to permit the distance between the periphery rollers to be adjusted to accommodate different container sizes, the distance between the arms being easily adjusted to accommodate different bottle sizes and the distance between the periphery rollers being easily adjusted to accommodate different bottle sizes without using arms of different sizes, each of the containers having an original center line on the line of travel for the container as the container travels around the turret periphery, the center line of another container having a different diameter size being the same as the original center line after adjusting the jaw means to hold and rotate the container.

2. A machine as defined in claim 1 in which periphery rollers are connected to pulley wheels that are driven around the turret periphery, each pulley wheel contacting a rope drive member disposed around the turret periphery.

3. A method for holding and rotating containers around a turret periphery, the method comprising the steps of:
A. feeding containers to the turret periphery,
B. grasping and holding each container with adjustable jaw means so constructed and arranged that the container is held in an aligned position while being transported and rotated around the periphery,
C. adjusting the adjustable jaw means to easily accommodate and hold a different diameter size of the containers, and
D. maintaining the same center line for the container with the different size container.

* * * * *